July 8, 1958  J. W. HUNEKE  2,842,156
LIQUID LEVEL CONTROL MEANS
Filed March 10, 1952
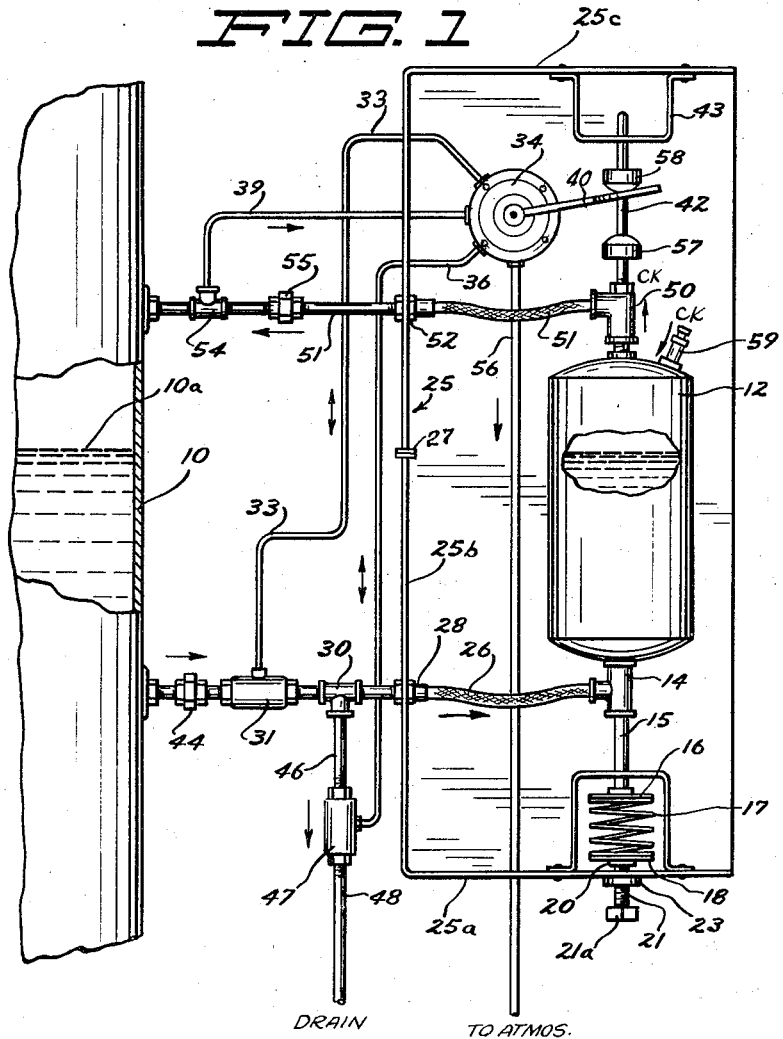
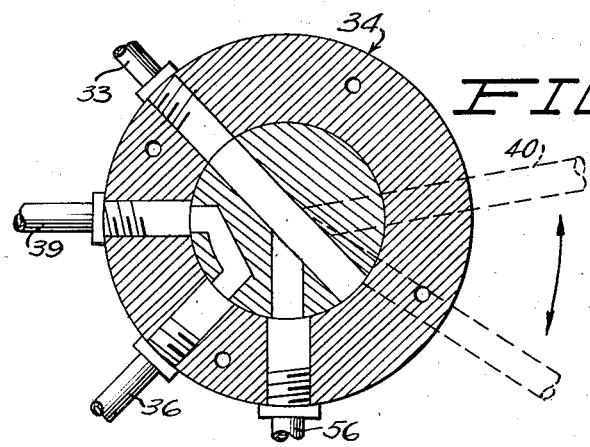
INVENTOR.
JOHN W. HUNEKE
BY
*Chas. C. Reif*
ATTORNEY.

United States Patent Office 2,842,156
Patented July 8, 1958

2,842,156

LIQUID LEVEL CONTROL MEANS

John W. Huneke, San Gabriel, Calif., assignor to Stanley G. Harwood, South Pasadena, Calif.

Application March 10, 1952, Serial No. 275,841

3 Claims. (Cl. 137—407)

This invention relates to a device for controlling a level of liquid in a vessel to which liquid is supplied. The device is adapted to be used with many vessels to which liquid is supplied, such as storage tanks for water or other liquids, hydropneumatic tanks, boilers, etc.

It is an object of this invention to provide a control means for establishing the level of liquid in a vessel, which control means comprises a container adapted to receive liquid, resilient means for moving said container to an upward position, said container being adapted to move downwardly against the pressure of said resilient means when containing sufficient liquid, a conduit for connecting the lower portion of said container to said vessel for transferring liquid from said vessel to said container, a second conduit connected to the upper portion of said container to permit passage of air therefrom, a member carried by said container, and means moved by said member for controlling the level of liquid in said vessel.

It is another object of the invention to provide such a device as set forth in the preceding paragraph, and a valve in said first mentioned conduit adapted to permit or prevent flow of liquid therethrough, a valve in said second conduit permitting flow through said second conduit to said vessel but preventing flow through said conduit to said container, a third conduit for discharging liquid from said container, a third valve in said third conduit for permitting or preventing flow of liquid therethrough, and means actuated by said member carried by said container for closing said first mentioned valve and opening said third valve when said container reaches its lower position to discharge liquid from said container.

It is a further object of the invention to provide a device for controlling the level of liquid in a vessel to which liquid is supplied comprising a container adapted to receive liquid, resilient means acting to move said container to an upper position, said container being adapted to move downwardly against the pressure of said resilient means when containing sufficient liquid, a conduit connecting the lower portion of said container to said vessel, a second conduit connecting the upper portion of said container to said vessel, means for supplying liquid to said vessel, a member carried by said container, and a control means actuated by said member when said container reaches its upper position for causing said container to render said means for supplying liquid to said vessel inoperative.

These and other objects and advantages of the invention will be fully set forth in the following description made in connection with the accompanying drawings in which like reference characters refer to similar parts throughout the several views and in which:

Fig. 1 is a somewhat diagrammatic view of one form of the invention, some parts being shown in front elevation, some parts being broken away, and other parts being shown in vertical section; and Fig. 2 is a central vertical longitudinal section of a valve of applicant's device.

Referring to the drawings, particularly Fig. 1, a vessel 10 is shown adapted to receive liquid, and said vessel specifically comprises a hydropneumatic tank or vessel to which liquid is supplied and which contains air above said liquid. A container 12 is provided, and in the embodiment of the invention illustrated, this is shown as a cylindrical tank of greater height than diameter. Said container 12 is shown as having a T connection 14 at its bottom and a rod 15 extends downwardly from member 14 and is secured at its bottom to a plate 16. Plate 16 engages the top of a compression coiled spring 17, the lower end of which engages a plate 18. Plate 18 is engaged at its bottom by a collar 20 secured to a screw 21 having a head or other means 21a at its lower end by which it can be turned. Screw 21 extends through a nut 23 secured to the lower side 25a of a supporting bracket 25. A plate member 27 may be secured to bracket 25 as shown to indicate the point where the high water level will be established, which will presently be described. A conduit 26 is connected to the T 14 and extends to and is connected to the vessel 10. Conduit 26 is illustrated as a flexible conduit between member 14 and a supporting coupling 28 carried in the vertical member 25b of the bracket 25. A T-member 30 is disposed in conduit 26. A valve 31 is disposed in conduit 26 between member 30 and vessel 10 and while this valve might take different forms, in the embodiment of the invention illustrated it is shown as a hydromatically or pneumatically operated valve. Said valve 31 has connected thereto a conduit 33 which extends to a valve 34. Valve 34 has connected thereto other conduits 36 and 56. Valve 34 has connected thereto another supply conduit 39. Valve 34 has a movable member therein adapted to connect conduits 33 with 56 and 39 with 36, or 33 with 39 and 36 with 56. Said movable member of valve 34 has connected thereto an arm 40, the end of which is formed as a fork, such as illustrated in Fig. 3, and said fork has passing therethrough a member 42 which is connected to and moves with container 12. Member 42 passes through and is guided in a bracket 43 secured to the upper portion 25c of bracket 25. A coupling 44 is shown in conduit 26, the same being provided for connecting purposes. A conduit 46 extends from T-member 30 and is connected to a valve 47. While valve 47 could take various forms, in the embodiment of the invention illustrated it is shown as a hydromatically or pneumatically operated valve and it has connected thereto the conduit 36. A conduit 48 extends from valve 47 and will lead to a suitable discharge place for liquid. Connected to container 12 above the top thereof is a check valve 50. Valve 50 permits passage of air from container 12 but prevents passage of air or liquid thereinto.

A conduit 51 is connected to check valve 50 and extends to and is connected to vessel 10 to communicate therewith. The portion of conduit 51 between member 50 and a coupling 52 is shown as flexible, said coupling 52 being supported on portion 25b of bracket 25. A T-member 54 is shown in conduit 51 and has connected thereto the conduit 39. A coupling 55 is disposed in conduit 51 for connecting purposes.

Rod 42 which is connected to the upper closed end of member 50 has secured thereto spaced members 57 and 58. Members 57 and 58 are adapted to engage and move arm 40 when container 12 is in different positions. A conduit 56 is connected to the casing of valve 34 and forms a discharge conduit for said valve. Container 12 has connected thereto a valve 59 adapted to permit passage of air into said container when liquid is discharged therefrom. Said valve prevents the passage of air outwardly from container 12. Such a valve is sometimes called a snifter valve.

In operation, when the system is started if there is not sufficient air in vessel 10, liquid will rise in said vessel above the desired high water level. Simultaneously liquid will rise in container 12, as will be explained presently, until a balance is reached and the desired water level is established. It may be stated that container 12 is located so that when it is in the upper position, the level therein corresponding with the desired high water level in vessel 10 is disposed about one-third of the way from the top of said container. This of course may vary. As the system is started, valve 34 is so positioned that conduit 33 will be connected with conduit 56 and conduit 36 will be connected with conduit 39. Conduit 56 discharges to the atmosphere. Thus pressure is relieved from valve 31 and thereby opening the same which permits the passage of liquid from vessel 10, through said valve and through conduit 26 to container 12. As liquid rises in container 12, the air in said container is forced through check valve 50 and through conduit 51 into said vessel 10. Water will continue to pass into said container 12 until it reaches the desired high water level and simultaneously the liquid rising in said container 12 continues to force air into vessel 10 until said desired high water level is established.

When the level of liquid in container 12 reaches a certain position, container 12 will be moved downwardly by gravity against the pressure of spring 17. Container 12 and all members attached to it will move downwardly. This will move member 40 downwardly and cause valve 34 to become re-positioned. Valve member 40 will be moved to cut off the connection between conduits 33 and 56 and to connect conduit 33 with conduit 39 and conduit 36 with conduit 56. Thus air from vessel 10 will pass into conduits 39 and 33 and the pressure from said air will close valve 31. The passage of liquid will therefore be stopped from vessel 10 to container 12. Simultaneously the release of air pressure from valve 47 through conduits 36 and 56 will open said valve and permit the passage of liquid therethrough from said container 12 through conduits 26, 46 and 48. As liquid flows out of said container 12, air can enter said container through valve 59. When liquid is discharged from container 12, said container will again be raised to its upper position by spring 17. Member 57 will then engage arm 49 and move valve 34 to the position it previously occupied, thus connecting conduit 33 with conduit 56 and conduit 36 with conduit 39. Conduits 33 and 36 respectively will be cut off from conduits 39 and 56. Valve 31 will again be opened and valve 47 closed. Liquid will again be supplied to container 12 and the above operation will be repeated. The charging of air into vessel 10 from container 12 will continue until sufficient air pressure is developed in said vessel so that the liquid in said vessel will not rise beyond the desired level as indicated at 10a in Fig. 1. The described operation will continue until the proper balance has been created in vessel 10. At the point of balance no further air will pass into said vessel and no further liquid will pass into said container. The high water level is thus established.

From the above description it will be seen that applicant has provided a comparatively simple and practically foolproof device for maintaining the proper level in liquid receiving vessels. It will be noted that the device employs no stems or shafts which must move through stuffing boxes or packing glands. Such stems and shafts often become stuck because of corrosion. The device needs no float or floats disposed in the liquid receiving vessel. Floats often lose their buoyancy in time by leaks or corrosion. The actuating force for the container 12 is only gravity and the pressure of the spring 17. The pressure of spring 17 can be adjusted by the screw 21. The device, as stated, is quite simple and the same can be easily installed.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A device for controlling a given liquid level in a vessel to which liquid is supplied having in combination, a vessel for receiving liquid, a control means for establishing said level of said liquid in said vessel comprising a container, a conduit connecting said vessel and container so that liquid flows into said container as it rises in said vessel to maintain a common liquid level in said vessel and in said container, a valve member in said conduit to control the flow of liquid therethrough, a resilient member acting to support and normally elevate said container to a certain position, said container moving downwardly against the pressure of said resilient member when sufficient liquid has entered the same, and means carried by said container for actuating said valve member to prevent flow of liquid into said vessel when said container is raised to a certain vertical position.

2. A device for controlling a given liquid level in a vessel to which liquid is supplied having in combination, a vessel for receiving liquid, a control means for establishing said level of said liquid in said vessel, a container adapted to receive said liquid, a conduit connecting said vessel and container so that liquid flows into said container as it rises in said vessel, a valve member in said conduit adapted to control the flow of liquid therethrough, resilient means acting to elevate said container to a certain position, said container being adapted to move downwardly against the pressure of said resilient means when sufficient liquid has entered the same from said vessel, a second conduit connecting the upper portion of said container to said vessel for permitting passage of air from said container to said vessel, a check valve in said second conduit preventing passage of air from said vessel to said container, a third conduit, a second valve in said third conduit adapted to be opened to permit discharge of the liquid in said container, a member carried by said container, and said control means being actuated by said member for closing said first mentioned valve and opening said last mentioned valve when said container reaches its lower position to cause discharge of liquid from said container whereby it will be raised by said resilient means whereby said container is moved upwardly and downwardly according to the weight of liquid therein to establish a desired level in said vessel.

3. The structure set forth in claim 2, and a valve at the top of said container permitting entry of air thereinto when the liquid is discharged from said container.

References Cited in the file of this patent

UNITED STATES PATENTS

| | | |
|---|---|---|
| 378,843 | Lillie | Feb. 28, 1888 |
| 1,667,057 | Smith | Apr. 24, 1928 |
| 1,815,347 | Cowles | July 21, 1931 |
| 2,037,879 | Chalatow | Apr. 21, 1936 |